US008317603B2

(12) United States Patent
Anderson

(10) Patent No.: US 8,317,603 B2
(45) Date of Patent: Nov. 27, 2012

(54) MULTI-TIERED COMPETITIVE WAGERING GAMES INCLUDING AWARD ENHANCEMENT IN SUBSEQUENT GAME

(75) Inventor: Peter R. Anderson, Glenview, IL (US)

(73) Assignee: WMS Gaming Inc., Waukegan, IL (US)

( * ) Notice: Subject to any disclaimer, the term of this patent is extended or adjusted under 35 U.S.C. 154(b) by 151 days.

(21) Appl. No.: 12/934,467

(22) PCT Filed: Mar. 20, 2009

(86) PCT No.: PCT/US2009/037778

§ 371 (c)(1),
(2), (4) Date: Sep. 24, 2010

(87) PCT Pub. No.: WO2009/120594

PCT Pub. Date: Oct. 1, 2009

(65) Prior Publication Data

US 2011/0045898 A1 Feb. 24, 2011

Related U.S. Application Data

(60) Provisional application No. 61/070,710, filed on Mar. 25, 2008.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ........................................................ 463/25

(58) Field of Classification Search ..................... 463/25
See application file for complete search history.

(56) References Cited

U.S. PATENT DOCUMENTS

| | | | |
|---|---|---|---|
| 6,406,369 | B1 | 6/2002 | Baerlocher et al. |
| 7,032,901 | B2 | 4/2006 | Perrie et al. |
| 7,052,392 | B2 | 5/2006 | Tessmer et al. |
| 2002/0039923 | A1 | 4/2002 | Cannon et al. |

FOREIGN PATENT DOCUMENTS

| | | |
|---|---|---|
| WO | WO 2006/015442 | 2/2006 |

OTHER PUBLICATIONS

International Search Report corresponding to PCT/US2009/037778, United States Patent Office, dated May 12, 2009; 2 pages.

International Written Opinion corresponding to PCT/US2009/037778, United States Patent Office, dated May 12, 2009; 7 pages.

International Preliminary Report on Patentability corresponding to PCT/US2009/037778, United States Patent Office, dated Apr. 2, 2010; 7 pages.

*Primary Examiner* — William M. Brewster
(74) *Attorney, Agent, or Firm* — Nixon Peabody LLP

(57) ABSTRACT

A method of playing a competitive wagering game comprises receiving a wager from each of a first plurality of players, displaying to each of the first plurality of players a first wagering game, and in response to a first triggering event, entering the first plurality of players into a competitive wagering game. The method further comprises declaring a first one of the first plurality of players a winner of the competitive wagering game, in response to a second triggering event, entering the first player and a second plurality of players into a subsequent competitive wagering game and providing the first player with an award enhancement for use during the subsequent competitive wagering game.

25 Claims, 15 Drawing Sheets

MULTI-TIERED COMPETITIVE WAGERING GAMES INCLUDING AWARD ENHANCEMENT IN SUBSEQUENT GAME

CROSS REFERENCE TO RELATED APPLICATIONS

This application is a U.S. national stage application claiming priority from International Application No. PCT/US2009/037778, filed Mar. 20, 2009, which claims priority to U.S. Provisional Patent Application Ser. No. 61/070,710, filed Mar. 25, 2008, both of which are incorporated herein in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus, and methods for playing wagering games, and more particularly, to gaming systems having multi-tiered competitive wagering games.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

Gaming systems continue to evolve to include competitive, collaborative and team play in various group-play environments.

SUMMARY OF THE INVENTION

According to one aspect of the present invention, a method of playing a competitive wagering game comprises receiving a wager from each of a first plurality of players, displaying to each of the first plurality of players a first wagering game, and in response to a first triggering event, entering the first plurality of players into a competitive wagering game. The method further comprises declaring a first one of the first plurality of players a winner of the competitive wagering game, in response to a second triggering event, entering the first player and a second plurality of players into a subsequent competitive wagering game and providing the first player with an award enhancement for use during the subsequent competitive wagering game.

According to another aspect of the invention, a gaming system comprises a plurality of display terminals for displaying at least one primary wagering game, at least one wager input device, and at least one controller operative to (i) cause the plurality of display terminals to display the at least one primary wagering game to a first plurality of players, (ii) in response to a first triggering event, enter the first plurality of players into a first play of a competitive wagering game, (iii) determining a first subset of the first plurality of players which satisfy a first set of promotion criteria, (iv) provide each of the players in the first subset with an award enhancement for use in a subsequent play of the competitive wagering game, (v) enter each of the players in the first subset into a second play of the competitive wagering game, and (vi) enhance a total award achieved by each of the players in the first subset in the second play of the competitive wagering game with the award enhancement.

According to yet another aspect of the invention, a method of playing a competitive wagering game comprises determining a set of players in accordance with at least a first set of eligibility criteria, organizing the set of players into a plurality of tiers including at least a first tier and a second tier, displaying a first occurrence of the competitive wagering game and determining a first individual award in the competitive wagering game for each of the players in the first tier. The method further comprises evaluating each of the players in the first tier for promotion in accordance with a first set of promotion criteria, and for each players in the first tier meeting the first set of promotion criteria, promoting such player to the second tier for a second occurrence of the competitive wagering game. The method further comprises displaying the second occurrence of the competitive wagering game, determining a second individual award in the competitive wagering game for each of the players in the second tier, and for each of the players in the second tier, enhancing such players second individual award by a first award enhancement.

According to yet another aspect of the invention, one or more computer readable storage media is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

Figure 1A:
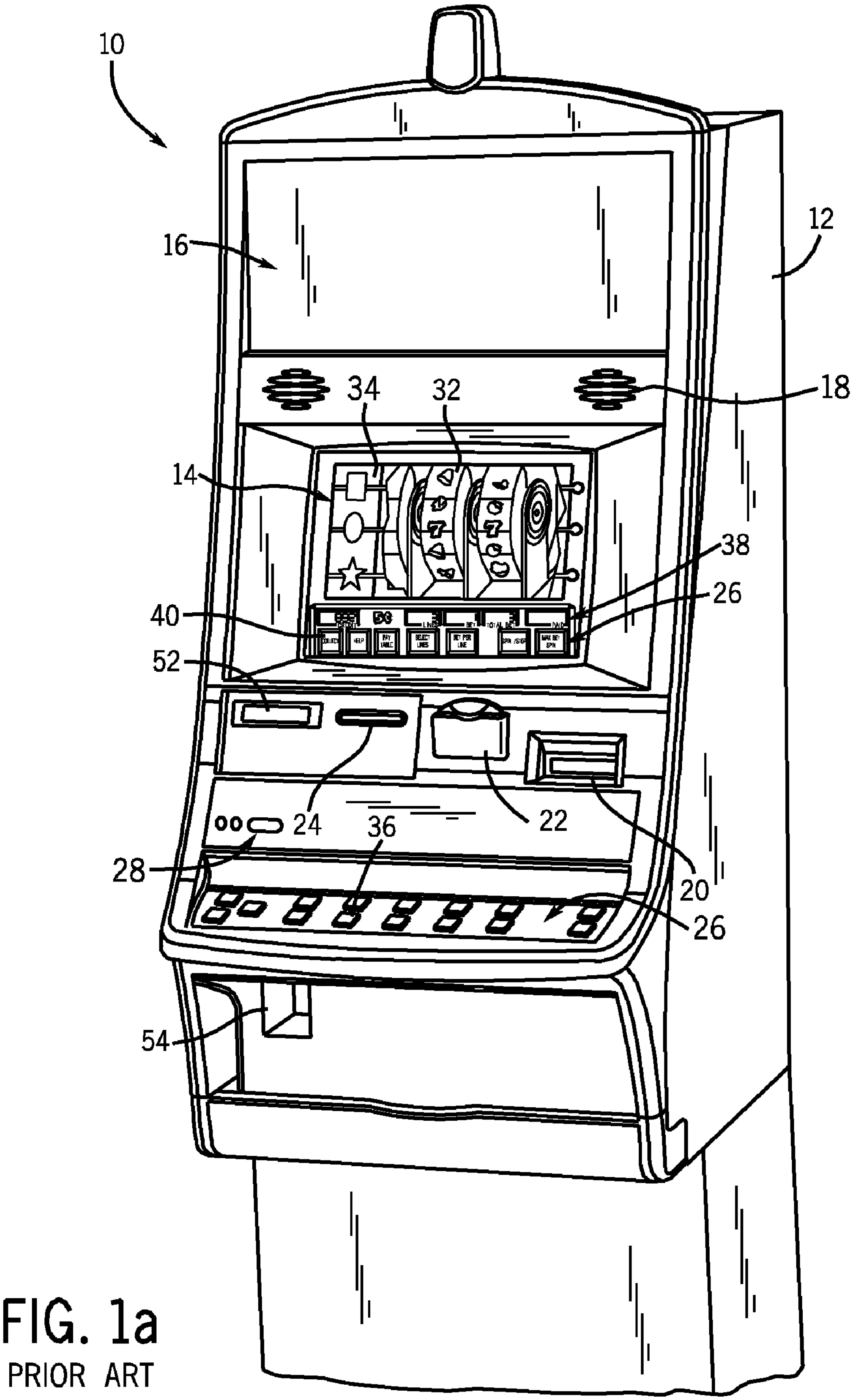
FIG. 1a PRIOR ART
FIG. 1*a* is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1B:
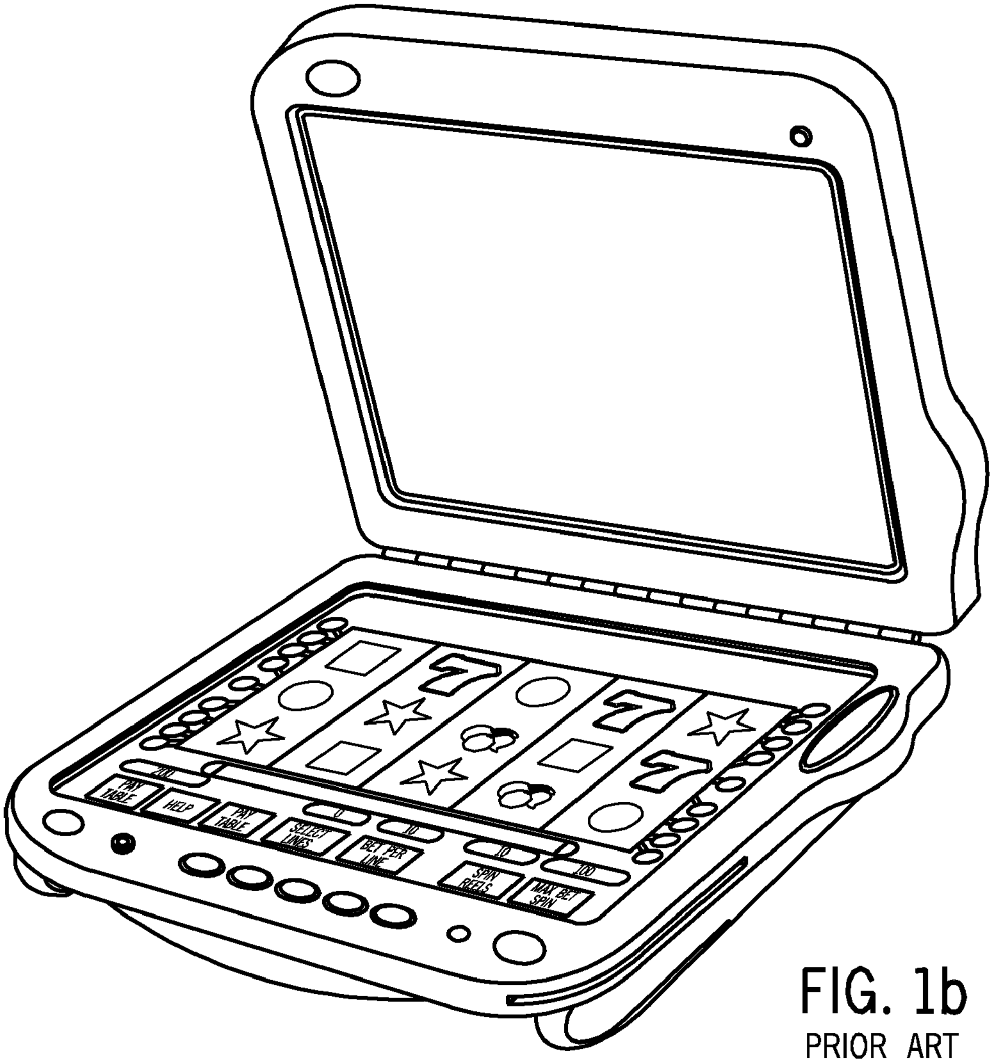
FIG. 1b PRIOR ART
FIG. 1*b* is a perspective view of a handheld gaming terminal according to an embodiment of the present invention.

Referring to FIG. 1*a*, there is shown a gaming terminal 10 similar to those used in gaming establishments, such as casinos. With regard to the present invention, the gaming terminal 10 may be any type of gaming terminal and may have varying structures and methods of operation. For example, the gaming terminal 10 may be an electromechanical gaming terminal configured to play mechanical slots, or it may be an electronic gaming terminal configured to play a video casino game, such as slots, keno, poker, blackjack, roulette, craps, etc. It should be understood that although the gaming terminal 10 is shown as a free-standing terminal of the upright type, it may take on a wide variety of other forms such as a free-standing terminal of the slant-top type, a portable or handheld device primarily used for gaming as shown in FIG. 1*b*, a mobile telecommunications device such as a mobile telephone or personal digital assistant (PDA), a counter-top or bar-top gaming terminal, or other personal electronic device such as a portable television, MP3 player, entertainment device, etc.

The illustrated gaming terminal 10 comprises a cabinet or housing 12. For output devices, the gaming terminal 10 may include a primary display area 14, a secondary display area 16, and one or more audio speakers 18. The primary display area 14 and/or secondary display area 16 may display information associated with wagering games, non-wagering games, community games, progressives, advertisements, services, premium entertainment, text messaging, emails, alerts or announcements, broadcast information, subscription information, etc. For input devices, the gaming terminal 10 may include a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements may exist and may be used in any number of combinations to create various forms of a gaming terminal.

The primary display area 14 may include a mechanical-reel display, a video display, or a combination thereof in which a transmissive video display in front of the mechanical-reel display portrays a video image superimposed over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display may be a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10. The primary display area 14 may include one or more paylines 30 (see FIG. 3) extending along a portion thereof. In the illustrated embodiment, the primary display area 14 comprises a plurality of mechanical reels 32 and a video display 34 such as a transmissive display (or a reflected image arrangement in other embodiments) in front of the mechanical reels 32. If the wagering game conducted via the gaming terminal 10 relies upon the video display 34 only and not the mechanical reels 32, the mechanical reels 32 may be removed from the interior of the terminal and the video display 34 may be of a non-transmissive type. Similarly, if the wagering game conducted via the gaming terminal 10 relies upon the mechanical reels 32 but not the video display 34, the video display 34 may be replaced with a conventional glass panel. Further, the underlying mechanical-reel display may be replaced with a video display such that the primary display area 14 includes layered video displays, or may be replaced with another mechanical or physical member such as a mechanical wheel (e.g., a roulette game), dice, a pachinko board, or a diorama presenting a three-dimensional model of a game environment.

Video images in the primary display area 14 and/or the secondary display area 16 may be rendered in two-dimensional (e.g., using Flash Macromedia™) or three-dimensional graphics (e.g., using Renderware™). The images may be played back (e.g., from a recording stored on the gaming terminal 10), streamed (e.g., from a gaming network), or received as a TV signal (e.g., either broadcast or via cable). The images may be animated or they may be real-life images, either prerecorded (e.g., in the case of marketing/promotional material) or as live footage, and the format of the video images may be an analog format, a standard digital format, or a high-definition (HD) digital format.

The player-input devices 26 may include a plurality of buttons 36 on a button panel and/or a touch screen 38 mounted over the primary display area 14 and/or the secondary display area 16 and having one or more soft touch keys 40. The player-input devices 26 may further comprise technologies that do not rely upon touching the gaming terminal, such as speech-recognition technology, gesture-sensing technology, eye-tracking technology, etc.

The information reader 24 is preferably located on the front of the housing 12 and may take on many forms such as a ticket reader, card reader, bar code scanner, wireless transceiver (e.g., RFID, Bluetooth, etc.), biometric reader, or computer-readable-storage-medium interface. Information may be transmitted between a portable medium (e.g., ticket, voucher, coupon, casino card, smart card, debit card, credit card, etc.) and the information reader 24 for accessing an account associated with cashless gaming, player tracking, game customization, saved-game state, data transfer, and casino services as more fully disclosed in U.S. Patent Publication No. 2003/0045354 entitled "Portable Data Unit for Communicating With Gaming Machine Over Wireless Link," which is incorporated herein by reference in its entirety. The account may be stored at an external system 46 (see FIG. 2) as more fully disclosed in U.S. Pat. No. 6,280,328 to Holch et al. entitled "Cashless Computerized Video Game System and Method," which is incorporated herein by referenced in its entirety, or directly on the portable medium. To enhance security, the individual carrying the portable medium may be required to enter a secondary independent authenticator (e.g., password, PIN number, biometric, etc.) to access their account.

FIG. **1*b* illustrates a portable or handheld device primarily used to display and/or conduct wagering games. The handheld device may incorporate the same features as the gaming terminal 10** or variations thereof. A more detailed description of a handheld device that may be utilized with the present invention can be found in PCT Patent Application No. PCT/US2007/000792 filed Jan. 26, 2007, entitled "Handheld Device for Wagering Games," which is incorporated herein by reference in its entirety.

Figure 2:
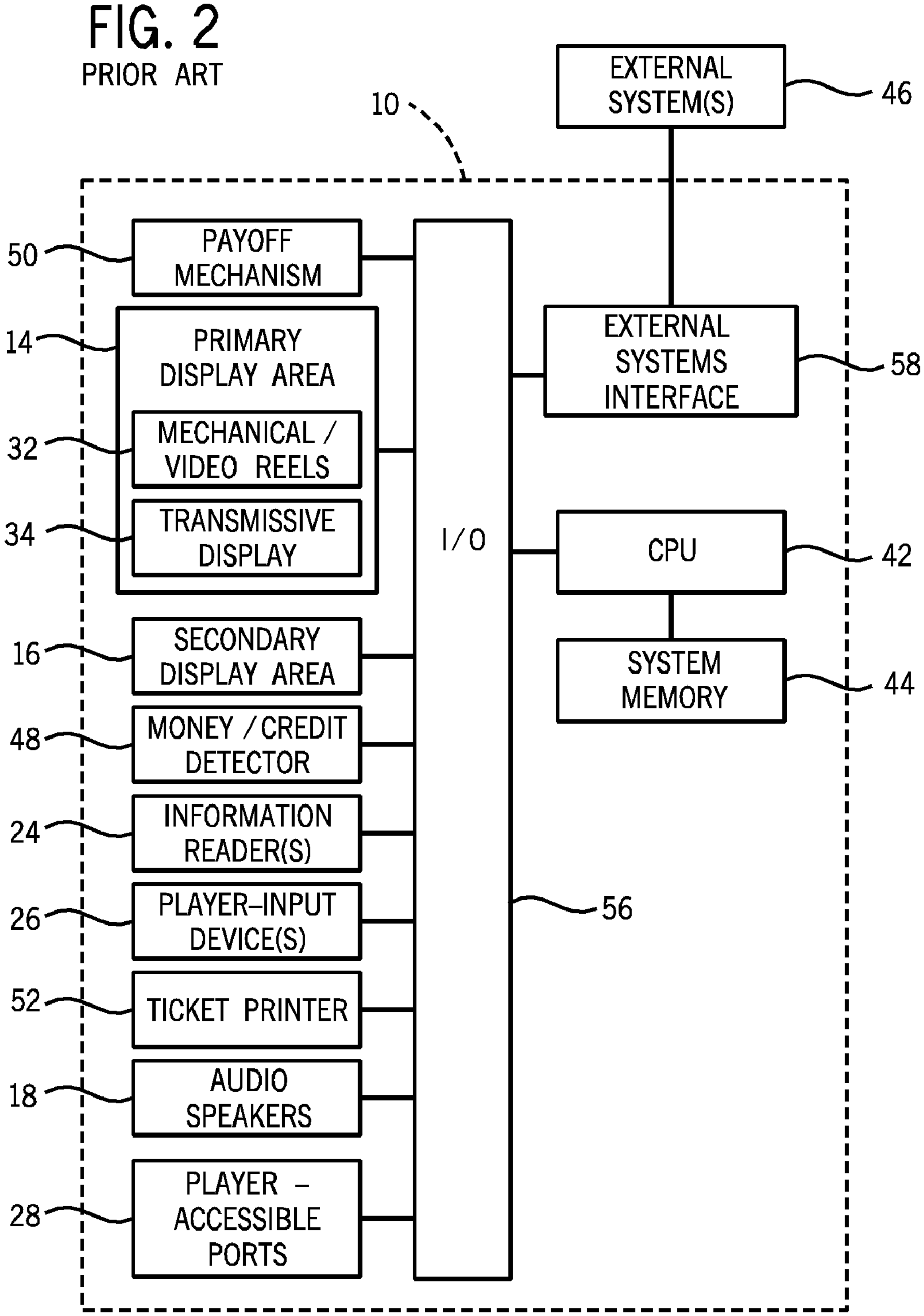
FIG. 2 PRIOR ART
FIG. 2 is a schematic view of a gaming system according to an embodiment of the present invention.

Turning now to FIG. 2, the various components of the gaming terminal 10 are controlled by a central processing unit (CPU) 42, also referred to herein as a controller or processor (such as a microcontroller or microprocessor). The CPU 42 can include any suitable processor, such as an Intel® Pentium processor, Intel® Core 2 Duo processor, AMD Opteron™ processor, or UltraSPARC® processor. To provide gaming functions, the controller 42 executes one or more game programs stored in one or more computer readable storage media in the form of memory 44 or other suitable storage device. The controller 42 uses a random number generator (RNG) to randomly generate a wagering game outcome from a plurality of possible outcomes. Alternatively, the outcome may be centrally determined using either an RNG or pooling scheme at a remote controller included, for example, within the external system 46. It should be appreciated that the controller 42 may include one or more microprocessors, including but not limited to a master processor, a slave processor, and a secondary or parallel processor.

The controller 42 is coupled to the system memory 44 and also to a money/credit detector 48. The system memory 44 may comprise a volatile memory (e.g., a random-access memory (RAM)) and a non-volatile memory (e.g., an EEPROM). The system memory 44 may include multiple RAM and multiple program memories. The money/credit detector 48 signals the processor that money and/or credits have been input via a value-input device, such as the bill validator 20, coin acceptor 22, or via other sources, such as a cashless gaming account, etc. These components may be located internal or external to the housing 12 of the gaming terminal 10 and connected to the remainder of the components of the gaming terminal 10 via a variety of different wired or wireless connection methods. The money/credit detector 48 detects the input of funds into the gaming terminal 10 (e.g., via currency, electronic funds, ticket, card, etc.) that are generally converted into a credit balance available to the player for wagering on the gaming terminal 10. The credit detector 48 detects when a player places a wager (e.g., via a player-input device 26) to play the wagering game, the wager then generally being deducted from the credit balance. The money/credit detector 48 sends a communication to the controller 42 that a wager has been detected and also communicates the amount of the wager.

As seen in FIG. 2, the controller 42 is also connected to, and controls, the primary display area 14, the player-input device 26, and a payoff mechanism 50. The payoff mechanism 50 is operable in response to instructions from the controller 42 to award a payoff to the player in response to certain winning outcomes that might occur in the base game, the bonus game(s), or via an external game or event. The payoff may be provided in the form of money, redeemable points, services or any combination thereof. Such payoff may be associated with a ticket (from a ticket printer 52), portable data unit (e.g., a card), coins, currency bills, accounts, and the like. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+frontside bus and a PCI backside bus. Although the I/O circuit 56 is shown as a single block, it should be appreciated that the I/O circuit 56 may include a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface 58, which is connected to the external system 46. The controller 42 communicates with the external system 46 via the external system interface 58 and a communication path (e.g., serial, parallel, IR, RC, 10bT, etc.). The external system 46 may include a gaming network, other gaming terminals, a gaming server, a remote controller, communications hardware, or a variety of other interfaced systems or components.

Controller 42, as used herein, comprises any combination of hardware, software, and/or firmware that may be disposed or resident inside and/or outside of the gaming terminal 10 and may communicate with and/or control the transfer of data between the gaming terminal 10 and a bus, another computer, processor, or device and/or a service and/or a network. The controller 42 may comprise one or more controllers or processors. In FIG. 2, the controller 42 in the gaming terminal 10 is depicted as comprising a CPU, but the controller 42 may alternatively comprise a CPU in combination with other components, such as the I/O circuit 56 and the system memory 44. The controller 42 is operable to execute all of the various gaming methods and other processes disclosed herein.

The gaming terminal 10 may communicate with external system 46 (in a wired or wireless manner) such that each terminal operates as a "thin client" having relatively less functionality, a "thick client" having relatively more functionality, or with any range of functionality therebetween (e.g., a "rich client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets may be contained within the gaming terminal 10 ("thick client" gaming terminal), the external systems 46 ("thin client" gaming terminal), or distributed therebetween in any suitable manner ("rich client" gaming terminal).

Figure 3:
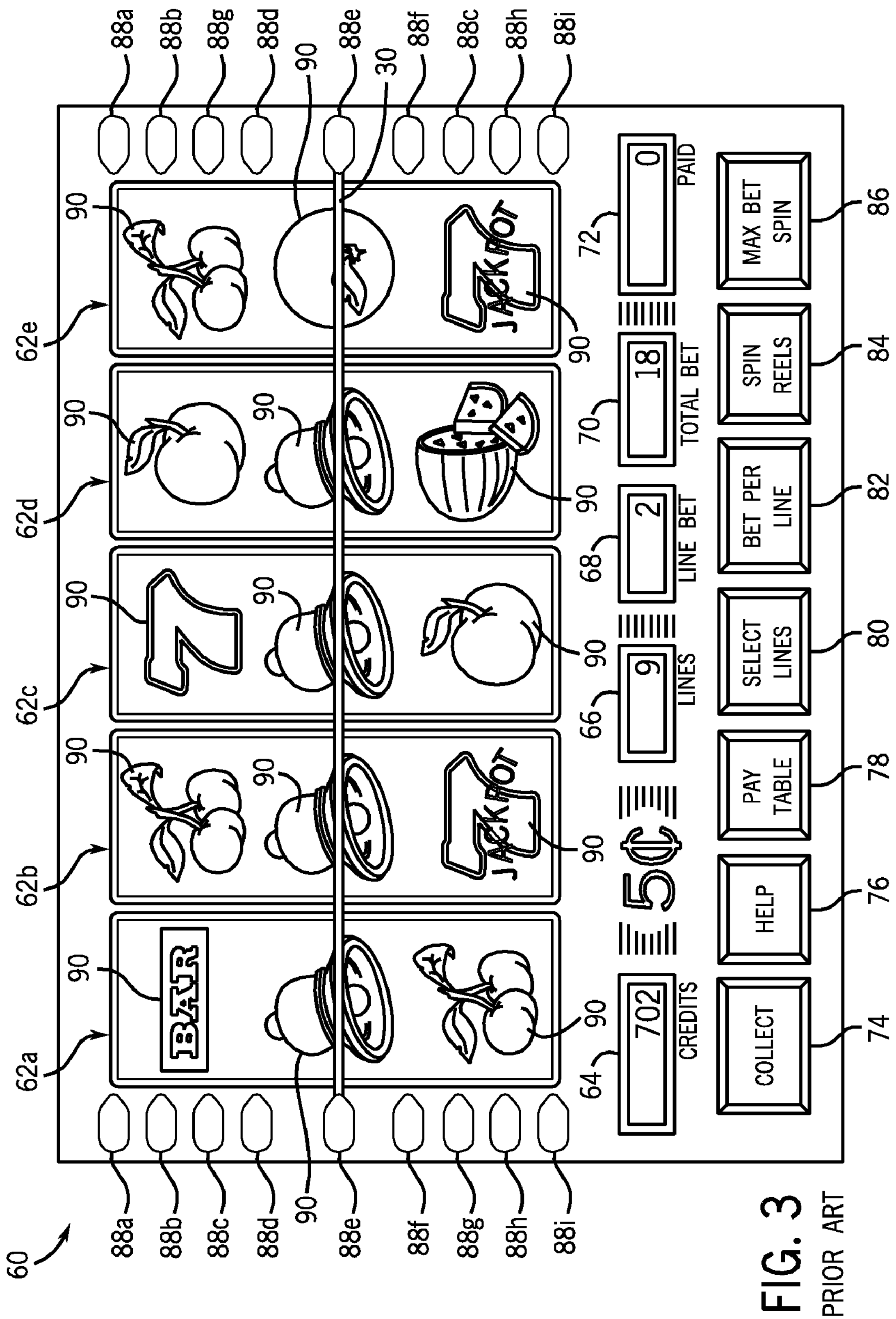
FIG. 3 PRIOR ART
FIG. 3 is an image of a basic-game screen of a wagering game that may be displayed on a gaming terminal, according to an embodiment of the present invention.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

The basic-game screen 60 may be displayed on the primary display area 14 or a portion thereof. In FIG. 3, the basic-game screen 60 portrays a plurality of simulated movable reels 62*a-e*. Alternatively or additionally, the basic-game screen 60 may portray a plurality of mechanical reels. The basic-game screen 60 may also display a plurality of game-session meters and various buttons adapted to be actuated by a player.

In the illustrated embodiment, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The user-selectable buttons may include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

Paylines 30 may extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations may be evaluated as line pays or scatter pays. Line pays may be evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown, a gaming terminal with any plurality of reels may also be used in accordance with the present invention.

Figure 4:
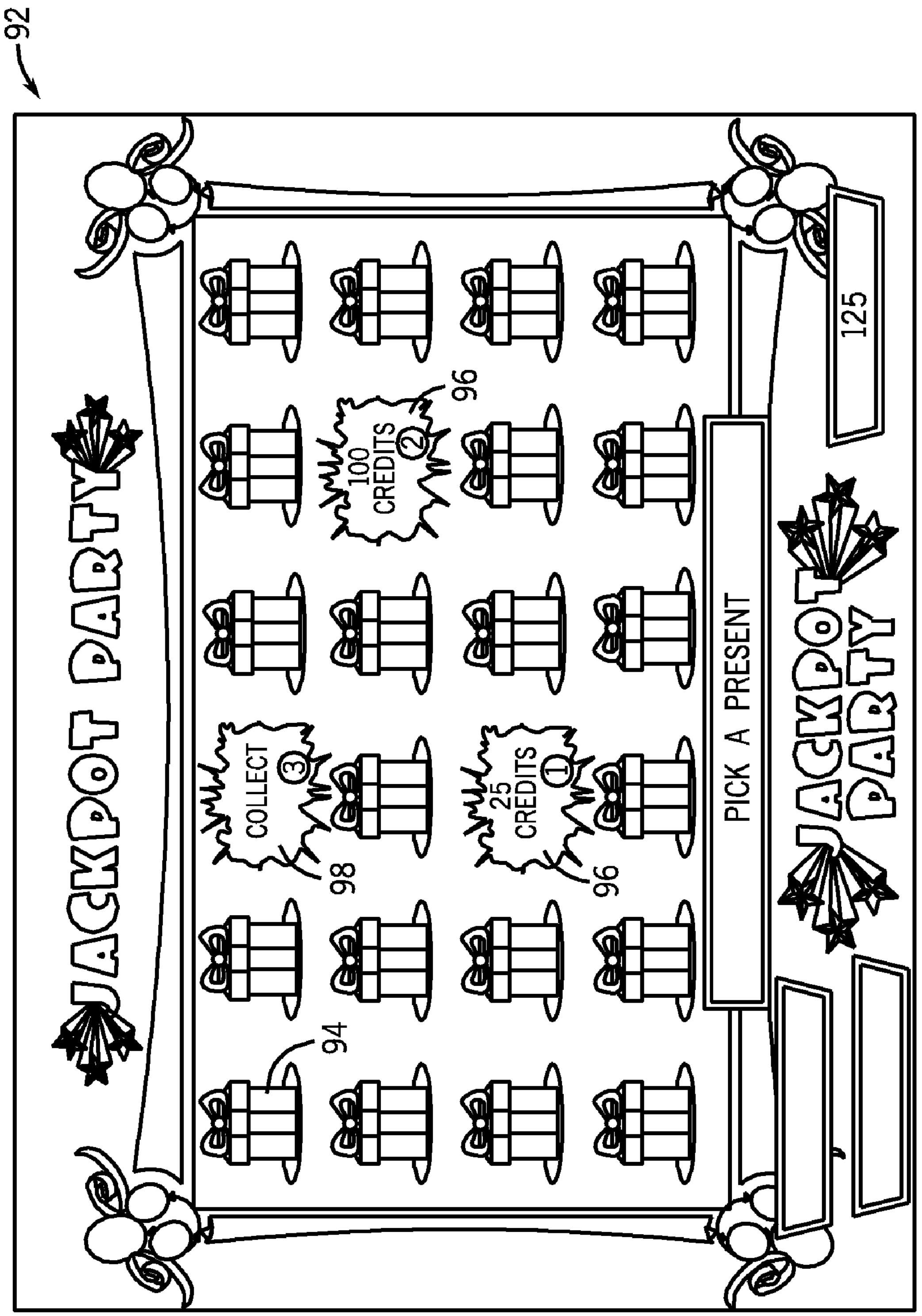
FIG. 4 PRIOR ART
FIG. 4 is an image of a bonus-game screen of a wagering game that may be displayed on a gaming terminal, according to an embodiment of the present invention.

Turning now to FIG. 4, a bonus game that may be included with a basic wagering game is illustrated, according to one embodiment. A bonus-game screen 92 includes an array of markers 94 located in a plurality of columns and rows. The bonus game may be entered upon the occurrence of a special start-bonus game outcome (e.g., symbol trigger, mystery trigger, time-based trigger, etc.) in or during the basic wagering game. Alternatively, the illustrated game may be a stand-alone wagering game.

In the illustrated bonus game, a player selects, one at a time, from the array of markers 94 to reveal an associated bonus-game outcome. According to one embodiment, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated and the accumulated award outcomes 96 are provided to the player.

Figure 5:
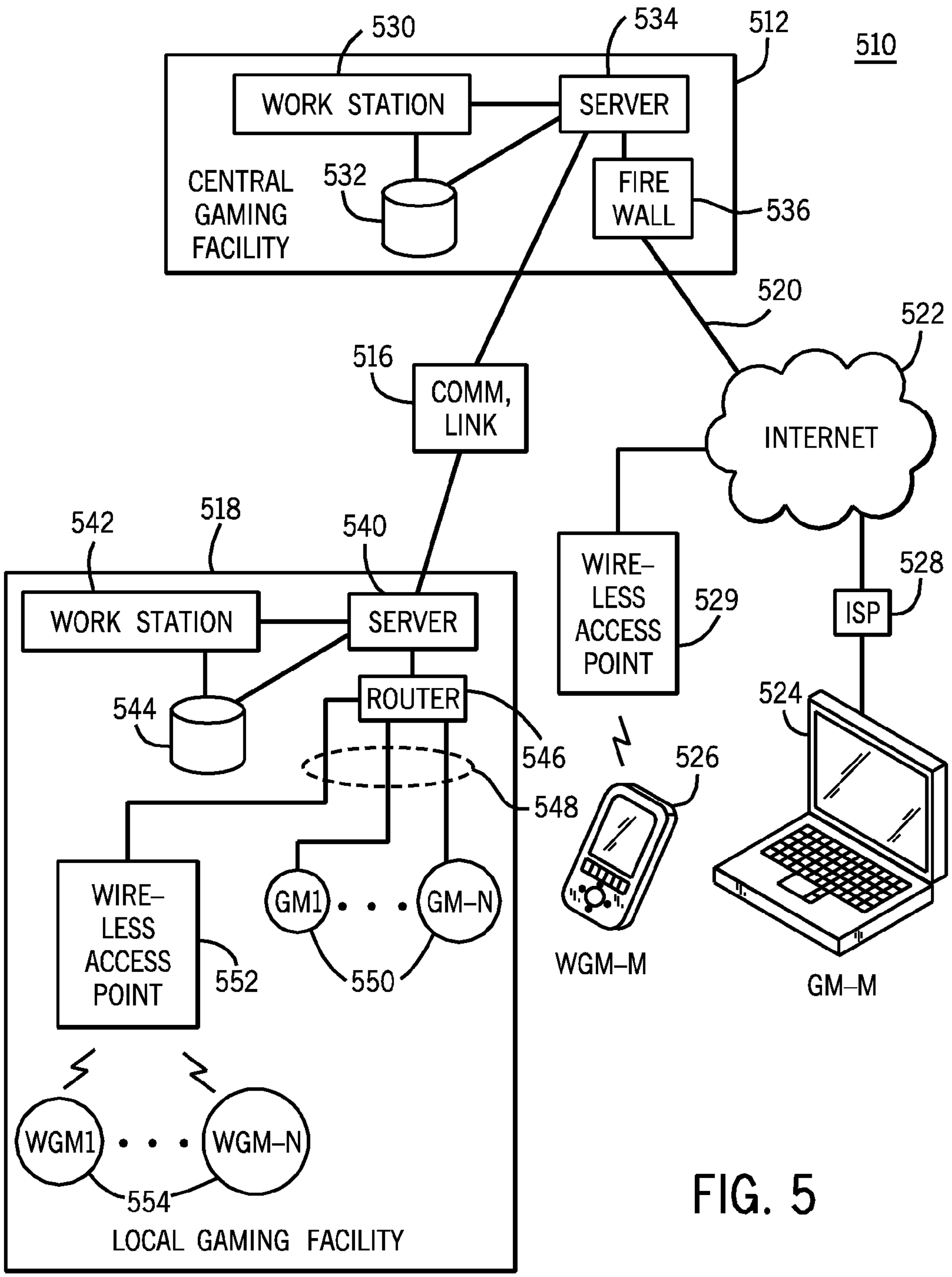
FIG. 5 is a diagram of a gaming system for executing and displaying multi-tiered competitive wagering games.

Referring now to FIG. 5, an exemplary gaming system 510 includes a central gaming facility 512 connected by communication link 516 to a local gaming facility 518, e.g. a casino, and by link 520 with the internet 522. End user computing devices including a gaming machine or terminal GM-M 524, e.g. a laptop computer, and wireless gaming machine or terminal WGM-M 526, e.g. a personal digital assistant (PDA), function as clients of the central gaming facility 512. Laptop 524 is coupled via internet service provider 528 and the internet 522 with the central gaming facility 512. The PDA 526 is connected with a wireless link by the wireless access point 529 and internet 522 to the central gaming facility 512. As used herein, "gaming" refers to the use of various games that support the placing of wagers on the outcome of the games, e.g. a video poker machine.

The central gaming facility 512 may represent a control location of a gaming business operator that supports individual gaming users, e.g. users of PDA 526 and laptop 524, as well as other gaming facilities of the operator such as casino 518. The central gaming facility 512 in this illustrative example may be geographically separated from the casino 518 and the individual users. The central gaming facility 512 includes a workstation 530 supported by data storage element 532 and a server 534 that serves as a communication host for casino 518 and the individual users via firewall 536. Requests for information and/or data received from the individual users are processed by server 534. The requested information and/or data may be obtained from support resources, e.g. workstation 530 and data residing in storage element 532. The requested information is sent from the server 534 to the requesting user's devices.

The local gaming facility 518 represents a casino and includes a server 540 supported by a workstation 542, data storage element 544 and a router 546. The router 546 supports communications with different gaming machines or terminals GM(1)-GM(N) 550 by wired links 548. A wireless access point 552 is connected by a wired link 548 to router 546 and by wireless communication links to wireless gaming machines or terminals WGM(1)-WGM(N) 554.

At least some of the gaming machines 550 and some of the wireless gaming machines 554 support the play of wagering games in which the user's gaming machine functions in the client/server communication model with the user's gaming machine being a client of server 540. The user's gaming machine contains software which is responsible for the ongoing play of the wagering game. However, some information or data associated with the play of the game may be obtained during the ongoing play of the game from server 540. Thus, the gaming system 510 displayed and described may be configured to execute and display a variety of primary wagering games and multi-tiered competitive wagering games on the terminals [GM(1)-GM(N) 550, WGM(1)-WGM (N) 554, GM-M 524, and WM-M 526], as explained further herein.

Figure 6:
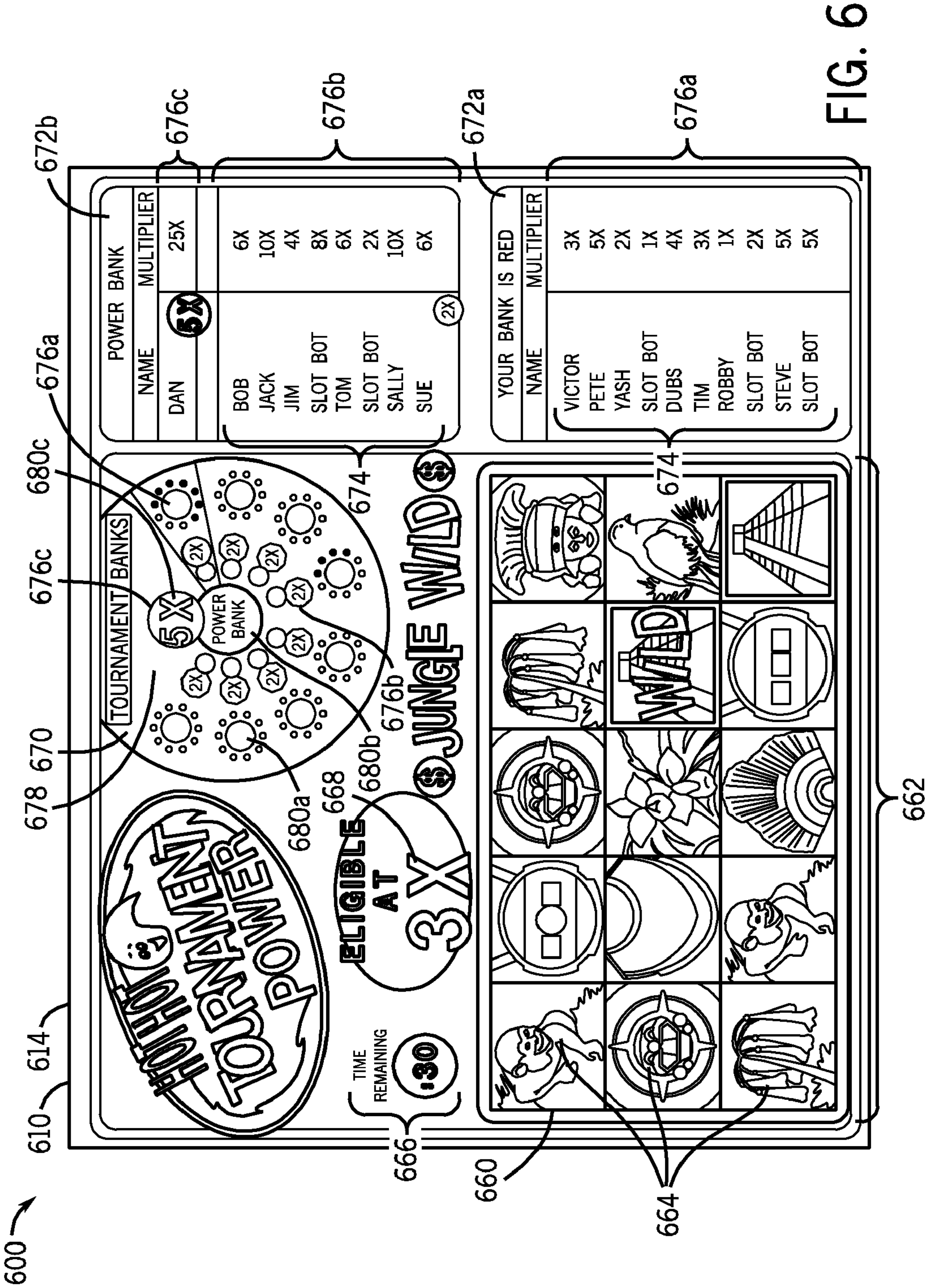
FIG. 6 is a primary display of a gaming terminal of the gaming system of FIG. 5, displaying primary and competitive wagering games.

Turning to FIG. 6, a primary display 614 of a gaming device or terminal 610 of a gaming system 600 (such as the exemplary gaming system in FIG. 5) is shown displaying a primary wagering game 660. The device or terminal 610 may be a freestanding gaming device as seen in FIG. 1*a*, a hand-held device as seen in FIG. 1*b*, or any other device having a display 614. In this embodiment, the primary wagering game 660 is a slot game and comprises a plurality of symbol bearing reels 662 which are spun and stopped to reveal combinations of symbols 664 which are evaluated for winning combinations. The primary display 614 further displays portions of a secondary wagering game 670, which is a competitive wagering game. The competitive wagering game 670 includes one or more leader boards 672*a,b* which display the performance of a plurality of players 674 in the competitive wagering game 670. The competitive wagering game 670 includes a plurality of tiers 676*a,b,c* which may be displayed using various graphical depictions. For example, in FIG. 6, the tiers 676*a, b,c* or levels are displayed visually using the lead boards 672*a,b* as well as using a visual map 678. In this embodiment, the visual map 678 includes depiction of a plurality of groups or virtual banks 680*a,b,c* corresponding to the plurality of tiers 676*a,b,c* or levels in the competitive wagering game 660. The primary display 614 also displays an eligibility and trigger meter 666 which informs the player as to the player's individual award portion 668 which in this case is a multiplier, and the player's eligibility time remaining in the event that an occurrence of the competitive wagering game 670 is triggered.

A first player may play the primary wagering game 660 at the first gaming device 610 or terminal and views the results thereof on the primary display 614. Simultaneously, other players may play the same or different primary wagering games at other gaming terminals of the gaming system 600. For example, the gaming system 600 may take the form of the system displayed and described with reference to FIG. 5. Thus, the various players of the various primary wagering games may be located in a variety of locations. Some players may be located in a casino, while others may be located in the same or different casino, or may be playing remotely, for example over an internet connection, a wireless connection, or a remote hardwired connection which is communication with the system 600. The first player commences play of the primary wagering game 660 by inputting one or more wagers via an appropriate wager input device and commencing play of the wagering game 660. Outcomes of the primary wagering game 660 appear on the primary display 614, and winning combinations are awarded in accordance with a pay table associated with the primary wagering game 660. For example, certain combinations of symbols 664 landing on active paylines are awarded with various prizes, awards, credit amounts, multipliers, etc.

As the first player plays the primary wagering game 660, he accrues eligibility for the competitive wagering game 670 when triggered. His eligibility may be determined using a number of criteria. In one embodiment, eligibility for participation in the competitive wagering game 670 comprises the player having a positive time balance in the eligibility and trigger meter 666 at such time that the competitive wagering game 670 is triggered. One such mechanism which may be used to both trigger the competitive wagering game 670 and determine eligibility therefore is a time-based triggering mechanism which is described in PCT Published Application WO/2006/121663 to Anderson et. al, entitled "Wagering Game with Time-Based Bonus" and assigned to WMS Gaming Inc., which is hereby incorporated in its entirety as if full set forth herein. The player may also be provided an individual award 668 or portion, which in an embodiment may be a multiplier. The multiplier may grow or increased based upon factors such as size of wagers input and rate of play of the primary wagering game 660 as described in the incorporated PCT Application. Many other triggering mechanisms and eligibility criteria may be used. For example, eligibility may be dependent upon the player wagering a certain minimum amount, maintaining a certain amount of time of play, maintaining at least a predetermined average wager, having a certain number of player points, reaching a certain level of a game, etc.

A triggering mechanism for the competitive wagering game 670, as seen in FIG. 6, is the occurrence of a randomly selected event. For example, numbers may be regularly randomly selected from a set of numbers until the selected number matches a triggering number which comprises a triggering event for the competitive wagering game 670. This creates a "mystery trigger" since the player is not aware of what has caused the triggering event to occur and the competitive wagering game 670 to begin. Thus as seen in FIG. 6, so long as the player has a positive time balance on the eligibility meter 666 (here the player has thirty seconds of eligibility remaining), he is eligible to play the competitive wagering game 670 if it is randomly triggered.

Many other triggering events may be utilized as well. For example, the competitive wagering game 670 may be triggered by expiration of a predetermined amount of time which may be hidden from the player, or shown in the form of a clock so that the player is aware of when the next occurrence of the competitive wagering game 670 will be. In another embodiment, the time-based trigger described previously is utilized such that a player builds up a multiplier based upon amount and speed of wager, and a randomly selected event (a mystery trigger) triggers the competitive wagering game 670. In yet other embodiments, other triggering events may be utilized. For example, crossing a threshold of coin-in collected from play of the wagering games on the system 600 may trigger the competitive wagering game 670. Moreover, the triggering event may comprise a symbol-based or outcome-based trigger, such as a certain configuration of symbols 664 occurring in a defined pattern or arrangement in the primary wagering game 660. For example, five like symbols 664 landing on activated pay line may trigger the competitive wagering game 670.

Figure 7:
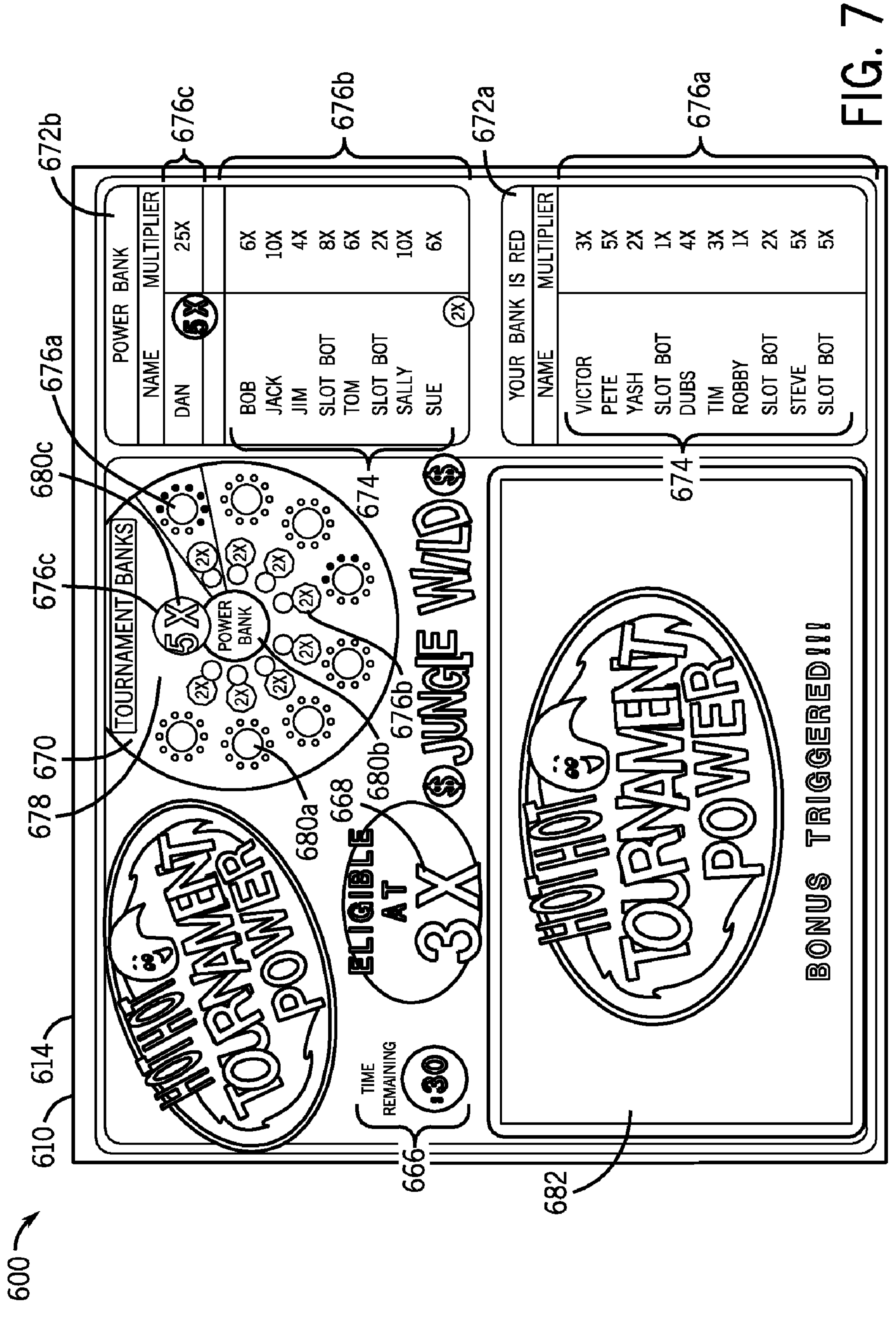
FIG. 7 is the gaming terminal of FIG. 6 displaying a triggering event for a first occurrence of a competitive wagering game.

Turning to FIG. 7, the primary display 614 is shown depicting the occurrence of a first triggering event (a mystery trigger) which triggers the commencement of the competitive wagering game 670. The primary display 614 communicates the occurrence of the triggering event to the player by displaying "Hot Hot Tournament Power Bonus Triggered" in a pop up window 682 overlying the primary wagering game. In this embodiment, the player is eligible for participation in the competitive wagering game 670 because there is a positive balance of time on his eligibility and time meter 666. The first player's individual award or multiplier is a 3× multiplier as displayed on the meter 666, and the player enters the competitive wagering game 670 carrying that individual portion with him for use therein, as described herein.

In the embodiment shown, because the first player (named Victor in this example) is newly entering the competitive wagering game 670, he is placed in the first tier 676*a* of the competitive wagering game 670, which in this embodiment is represented by a virtual bank or group of players known as the "Red Bank." Thus, the first leader board 672*a* depicts the players 674 in the first player's bank, and includes a label which informs the players that "Your Bank is Red." Listed in the first leader board 672*a* are the players 674 which are placed by the system 600 into the bank or group, and included is the first player (Victor). Listed next to each player's 674 name or other identifier is each player's corresponding individual award 668 (in this case a multiplier) carried over from the eligibility meter 666 at the time the competitive game 670 was triggered. Thus, since the first player (Victor) enters the competitive wagering game 670 with an individual award of a 3× multiplier, a "3×" is listed next to his name in the first leader board 672*a*. Similarly, the individual awards of the other players 674 are listed as well.

A second leader board 672*b* is shown which lists players which are grouped in the second and third tiers 676*b,c* of the competitive wagering game 670. The players 674 in the second tier 676*b* are players which have successfully completed a prior occurrence or "round" of the competitive wagering game 670 and achieved certain promotion criteria sufficient enough to be allowed to play a subsequent occurrence of the competitive wagering game 670 with some award enhancement. In an embodiment, as described herein, players who place first (or win) their virtual bank or group during one occurrence of the competitive wagering game 670 are promoted or moved to the next higher tier (second tier 676*b*) and permitted to play a subsequent occurrence of the competitive wagering game 670 with an award enhancement. Thus, the second and third tiers 676*b,c* of this embodiment of the competitive wagering game 670 are known (and appropriately labeled on the display 614) as the "Power Bank" of players 674.

The first player (Victor) is also informed as to which virtual bank he is assigned by the visual map 678. A highlighted portion of the visual map 678 highlights one of the banks 680*a* to which the first player (Victor) is assigned. The banks 680*a,b,c* are also arranged in a hierarchy, which in this case involves the first tier 676*a* of banks 680*a* arranged in an outer circle or semi-circle, the second tier 676*b* of banks 680*b* arranged in an interior circle or semi-circle, and the third tier 676*c* (the highest tier in this embodiment) positioned in the center or top of the map 678. This arrangement assists in the visual map 678 communicating to the players 674 their locations, and also their advancement from the first tier 676*a* to the second and third tiers 676*b,c* as they move from the outside banks 680*a* of machines to the inner and center locations 680*b,c*. Thus, the first player (Victor) is located at a gaming terminal 610 grouped in one of the first banks 680*a* (in this case the "Red Bank"). The banks 680*a,b,c* may be graphically represented in the visual map 678 and leader boards 672*a,b* using any appropriate graphics, including color coordination or animation to make visual association for the players 674 easier.

Figure 8:
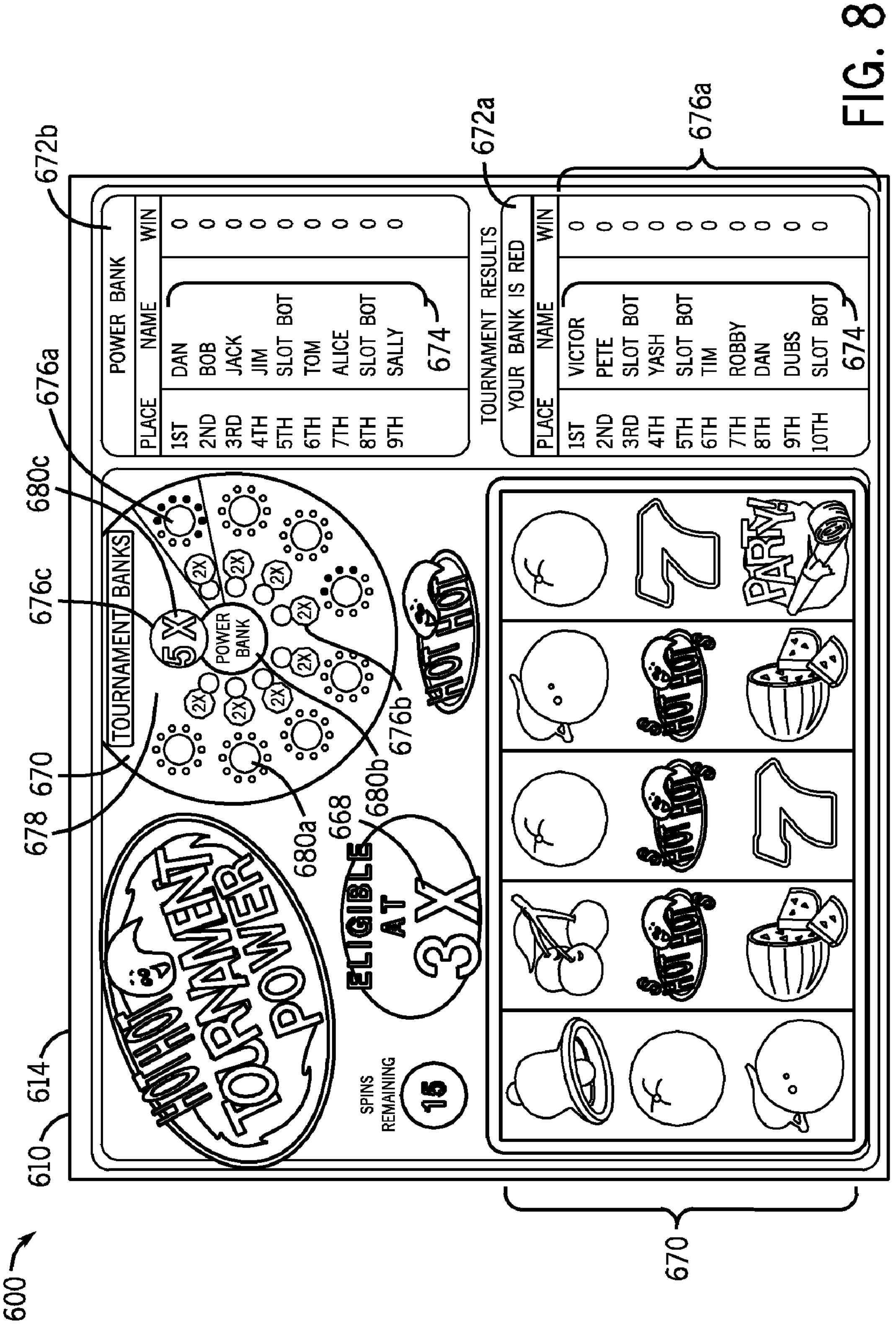
FIG. 8 is a primary display displaying play of the first occurrence of a competitive wagering game.

Turning to FIG. 8, the competitive wagering game 670 is shown at its commencement. In this embodiment, the competitive wagering game 670 is a slot tournament competition in which each player 674 is provided fifteen (15) free spins of a slot game. The slot game shown in the competitive wagering game 670 may be the same or different than that of the primary wagering game 660, and may include the same or different symbols therein. In one embodiment, the symbols on the reels in the competitive wagering game 670 are configured so that an increased number of winning outcomes occur to foster excitement, interest, and enjoyment of the competitive wagering game 670. As play in the competitive wagering game 670 commences, each player 674 earns credits for winning outcomes of the reels, and each player's 674 credit totals are reported in the appropriate column of the appropriate leader board 672*a,b*. Thus, the first player (Victor) can monitor his progress and position using the first leader board 672*a* which corresponds to displaying the progress of the players 674 in the bank 680*a* in which the first player (Victor) is located.

Figure 9:
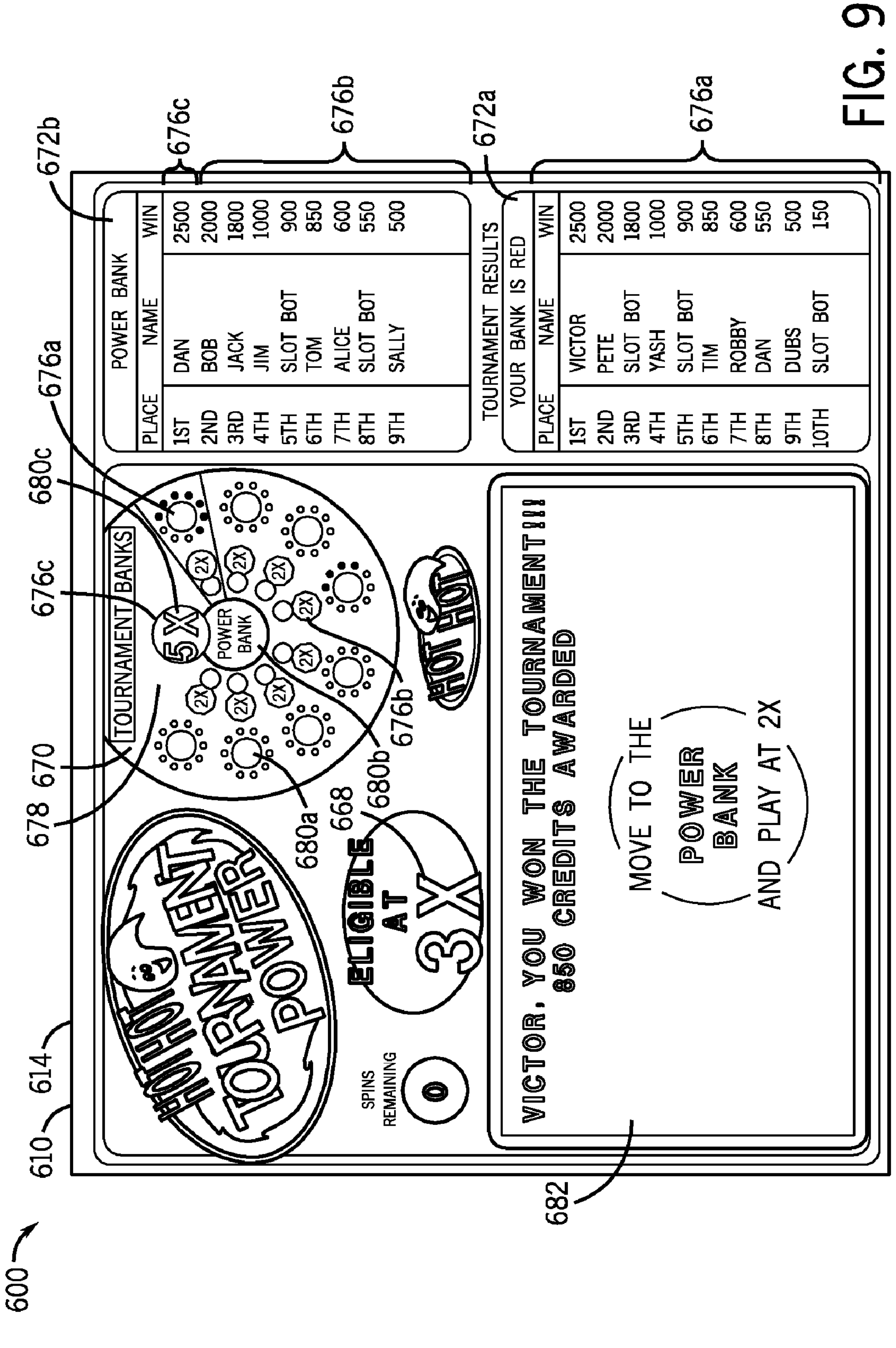
FIG. 9 is a primary display displaying a conclusion of the first occurrence of the competitive wagering game and promotion of a player to a higher tier of the competitive wagering game.

Turning to FIG. 9, a conclusion of a first occurrence of the competitive wagering game 670 is displayed. The competitive wagering game 670 has been completed and the players 674 have no remaining free spins, as seen on the display 614. The first player (Victor) has finished in first place for his bank 680*a*, as shown by the first leader board 672*a* where Victor has finished with 850 credits—more than any other player 674 in that bank 680*a* (the Red Bank). The first player (Victor) is awarded a total award which is his credit award accumulated (850 credits) as modified by his individual award (3× multiplier) for a total of 2,550 credits. The primary display 614 announces and displays the results with a message that says "Victor, You Won the Tournament-850 credits awarded." The display 614 also informs the first player (Victor) to "Move to the Power Bank and Play at 2×." Thus, by satisfying certain promotion criteria (in this case winning his bank), the first player (Victor) is promoted to a higher tier 676 for a subsequent play of the competitive wagering game 670. In so being promoted, the player (Victor) also receives an additional award enhancement, which in this case is a supplemental 2× multiplier for use in that subsequent occurrence of the competitive wagering game 670, as described herein. Thus, the additional award enhancement (2× multiplier) is saved and provided to the first player on a subsequent play of the competitive wagering game 670.

Figure 10:
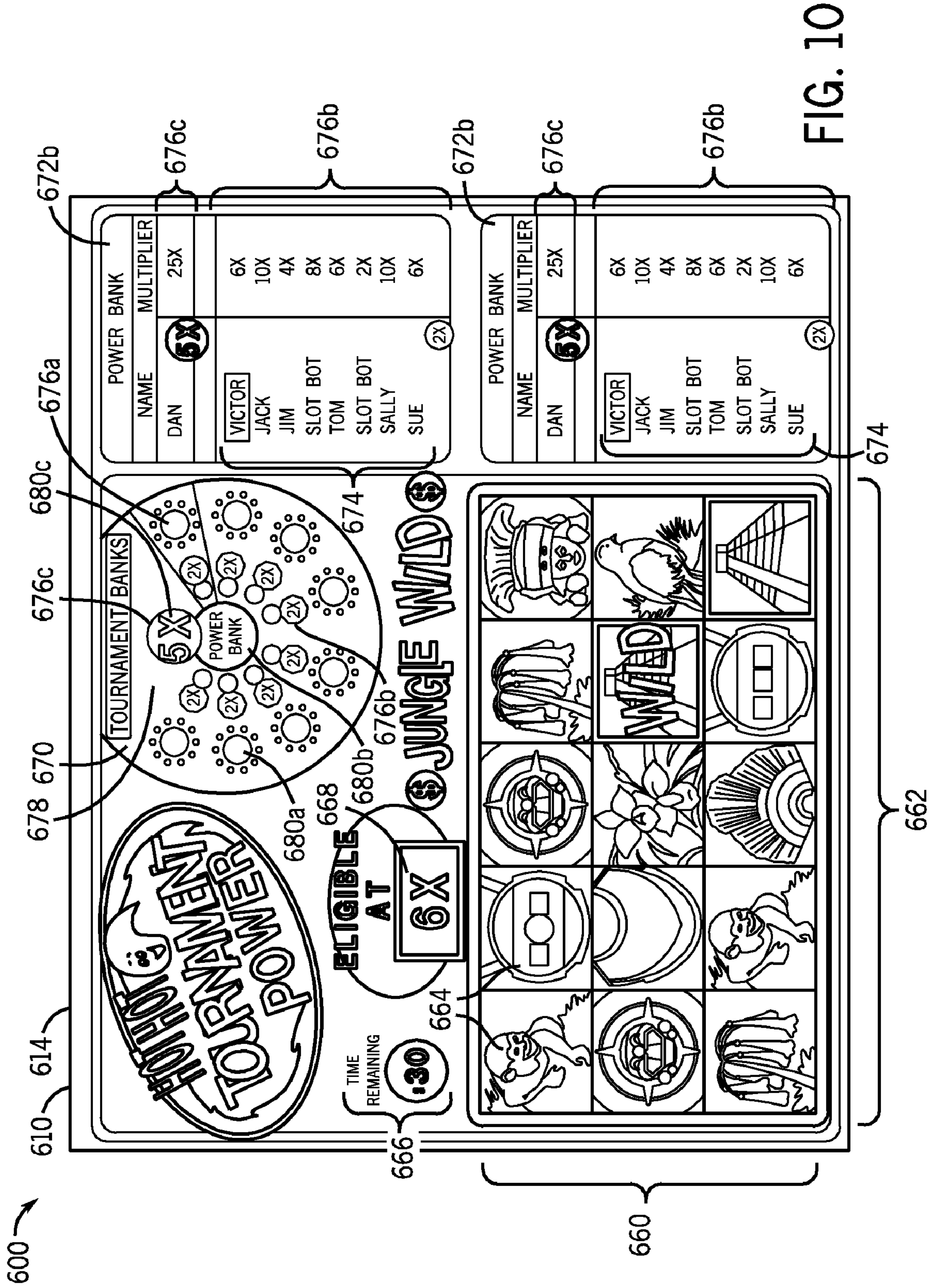
FIG. 10 is primary display returning to display the primary wagering game of FIG. 6.

Turning to FIG. 10, since the first occurrence of the competitive wagering game 670 has come to completion, the display 614 returns to displaying the primary wagering game 660. The eligibility and trigger meter 666 has now been updated to reflect the award enhancement received by the first player (Victor) who has been elevated or promoted to the next tier 676. Thus, the meter 666 shows that the first player is now eligible at a 6× multiplier which reflects the 3× multiplier earned by the first player modified by the 2× award enhancement granted due to the promotion to the next tier 676. The first player (Victor) is now "seated" at the Power Bank, and thus is placed in the second tier 676*b* of players. Because the first player (Victor) is seated at the Power Bank, the player's leader board 676*a* is replaced by the Power Bank leader board 676*b*, such that both leader boards shown on the display 614 are the same. In other words, the leader board 672 at the top of the display 614 is used to depict the players 674 in the Power Bank while the leader board 672 at the bottom of the display 614 is used to depict the players 674 in the first player's (Victor in this case) bank 680. When the first player is in the Power Bank, the leader boards 672 are the same.

As before, the leader board 672*b* depicts the name and individual award (multiplier) of each player in the bank 680*b*, in this instance, the Power Bank. The first player (Victor) is listed as is his corresponding individual award (multiplier) of 6×. In this embodiment, one player in the Power Bank is placed in a third tier 676*c* of the game 670 as described herein. The player in the third tier 676*c* receives an even greater award enhancement of 5× as seen in the virtual map 678. The player in the third tier 676*c* (Dan) is the player who won the Power Bank in the previous occurrence of the competitive wagering game 670, as seen in FIGS. 6-9.

Figure 11:
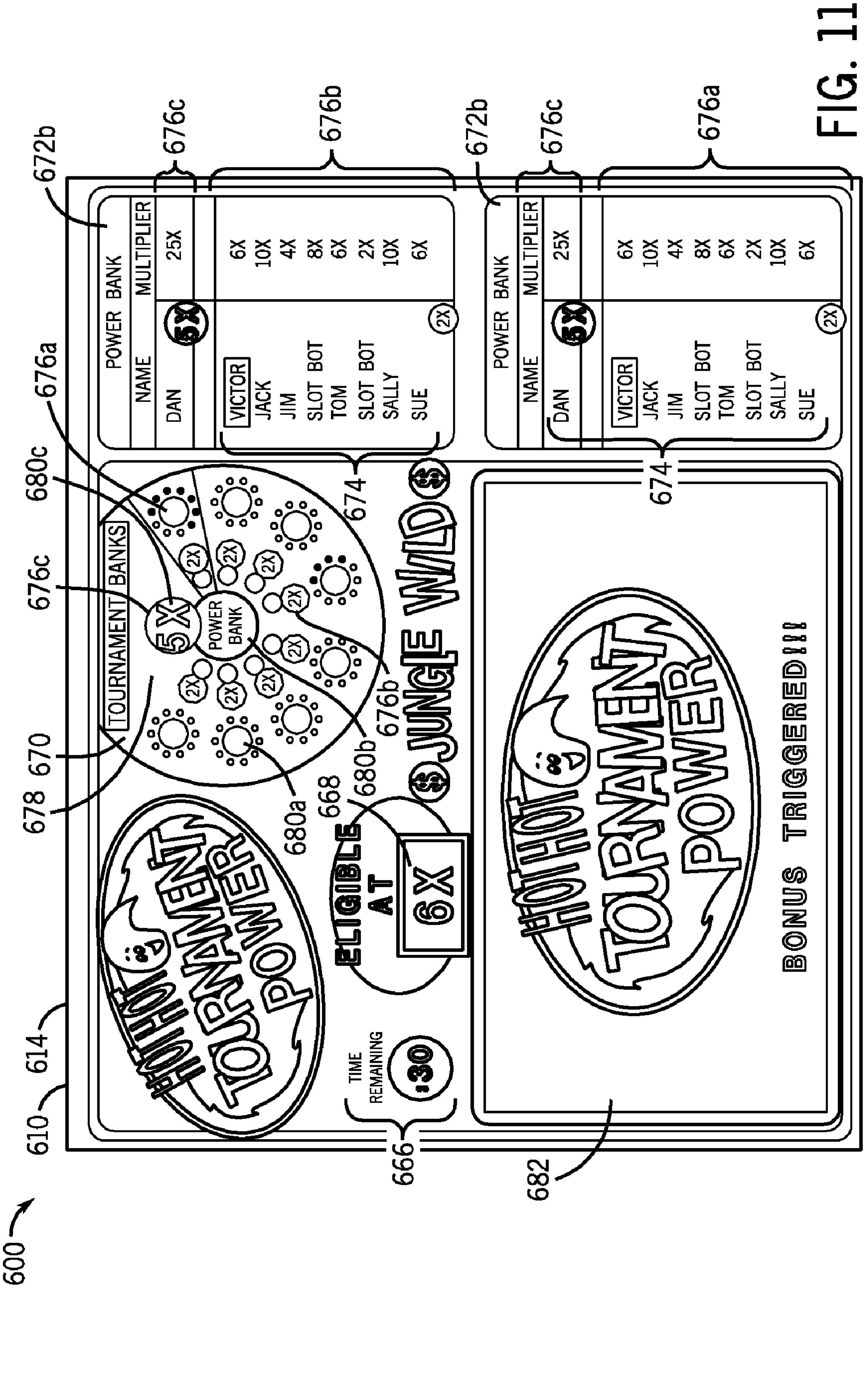
FIG. 11 is a primary display displaying a triggering event for a subsequent occurrence of the competitive wagering game.

In FIG. 11, a second or subsequent triggering event has occurred and is displayed on the display 614. The subsequent triggering event again comprises the occurrence of a randomly selected (mystery event) trigger while the player is eligible for participation in the competitive wagering game (has a positive time balance on the eligibility meter 666), as with the previous triggering event depicted in FIG. 7. The occurrence of this subsequent triggering event causes a second or subsequent occurrence of the competitive wagering game 670. In this embodiment, the first player (Victor), because he is "seated" at the Power Bank, enters the competitive wagering game 670 with an award enhancement, in the form of the additional 2× multiplier causing his individual award 668 (multiplier) to be enhanced to 6× (instead of 3×). The other players 674 in the power bank 680*b* enter the subsequent occurrence of the competitive wagering game 670 with their own individual awards (multipliers) which have also been similarly enhanced, as listed in the leader board 672*b*. Thus, in an embodiment, each player in the second tier 676*b* receives the same award enhancement.

Figure 12:
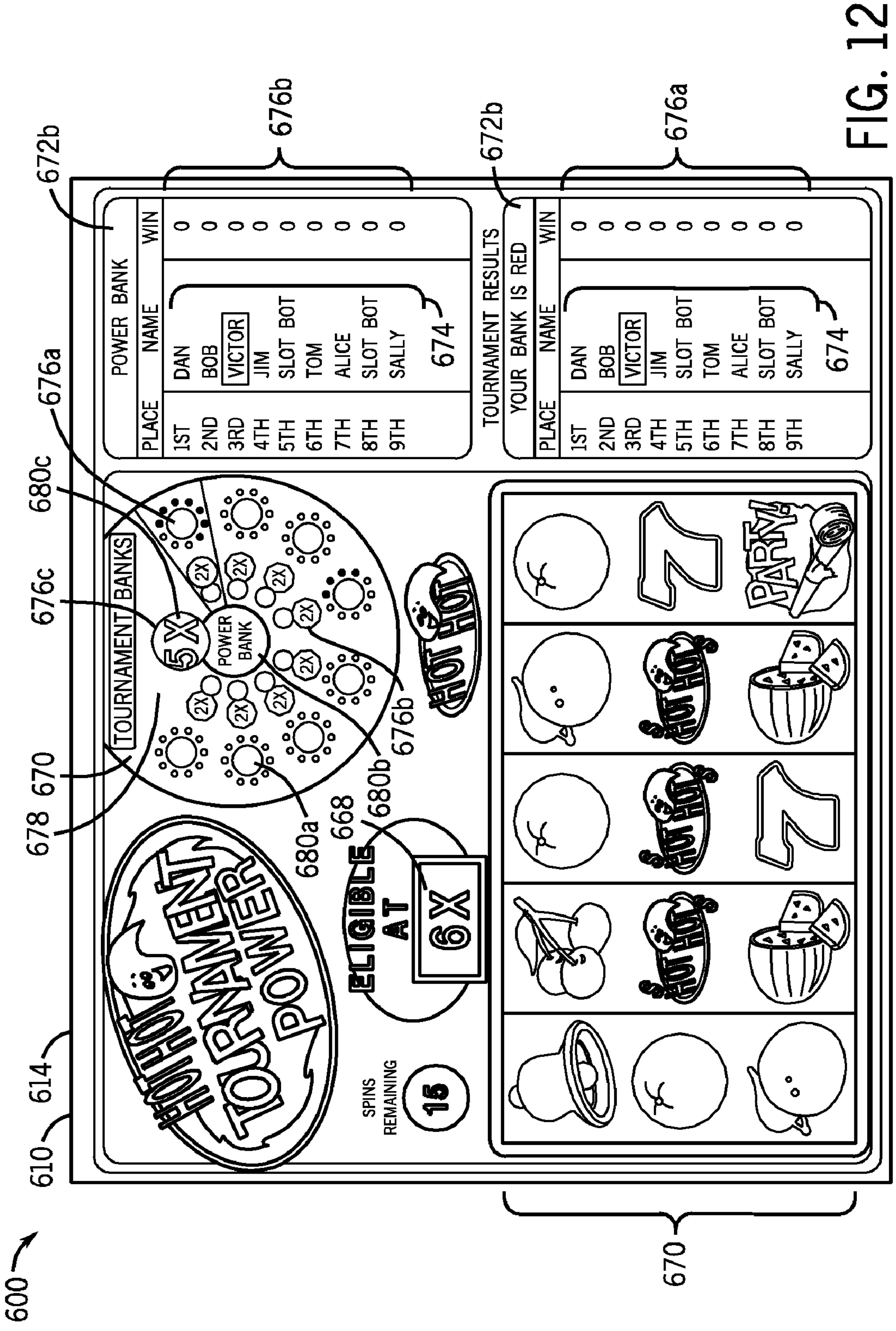
FIG. 12 is a primary display displaying play of the subsequent occurrence of the competitive wagering game.

Turning to FIG. 12, the competitive wagering game 670 commences for a subsequent occurrence in a fashion similar to the first occurrence depicted and described in FIG. 8. The leader board 672*b* changes to reflect the names of the player 674 in the Power Bank 680*b*, as well as their respective point totals accumulated in the free spins of the competitive wagering game 670. Each player 674 then commences playing the competitive wagering game 670 by executing their free spins and collecting associated credit amounts for winning combinations which occur therein. As before, fifteen (15) free spins are provided to each player during play of the competitive wagering game 670.

Figure 13:
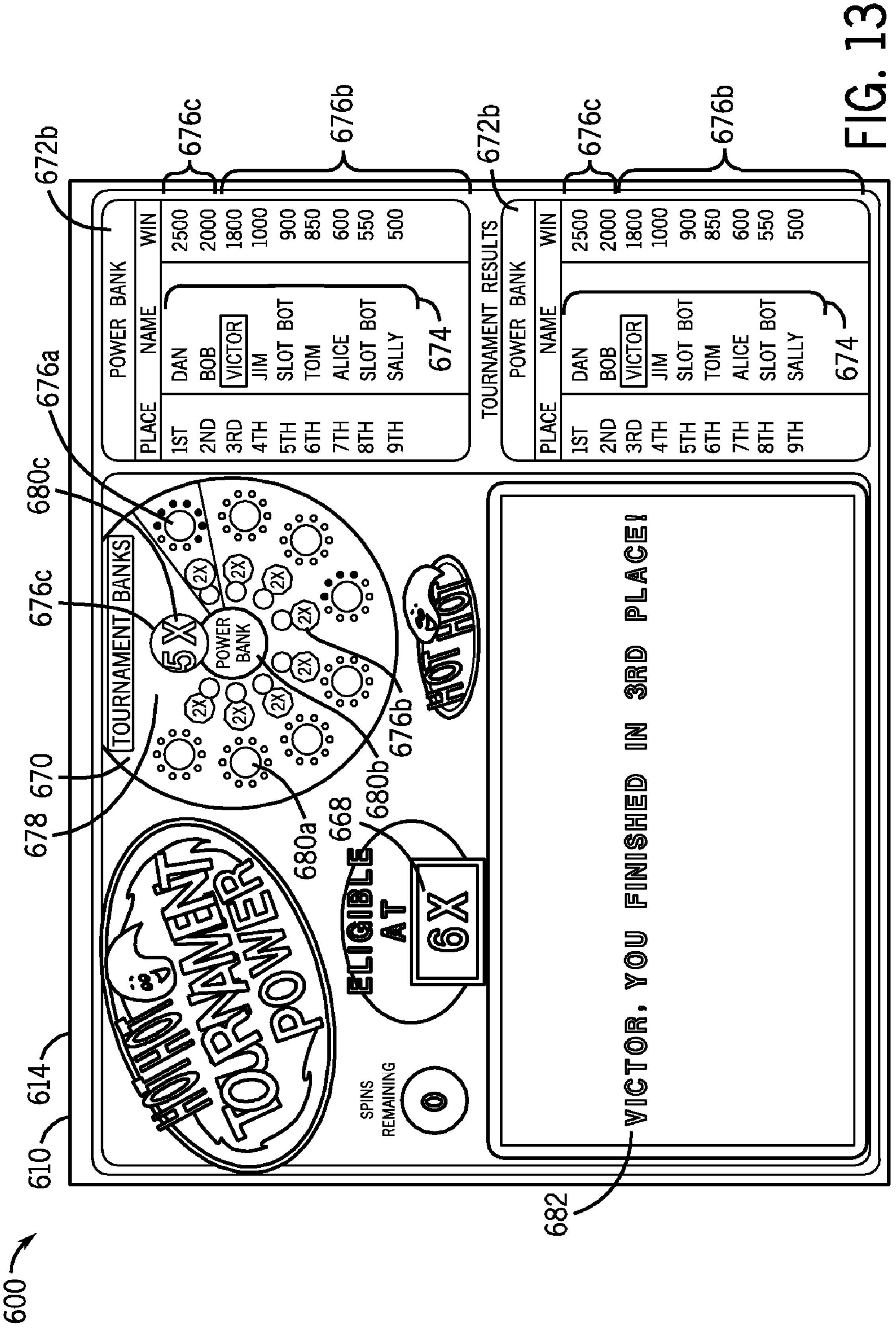
FIG. 13 is a primary display displaying a conclusion of the subsequent occurrence of the competitive wagering game.

In FIG. 13, the conclusion of the competitive wagering game 670 occurrence from FIG. 12 is shown. In the occurrence shown, the leader board 672*b* shows the final standings from the subsequent occurrence of the competitive wagering game 670. The player with the highest score (Dan) is promoted to the third tier 676*c* (or lead-chair) of the Power Bank 680*c*. In this example, since the winning player (Dan) had previously entered the competitive wagering game 670 in the third tier 676*c*, he is maintained in the third tier 676*c*. Had another one of the players in the second tier 676*b* won the Power Bank on this occurrence of the competitive wagering game 670, Dan would have been removed from the Power Bank, and replaced by such winning player (who would have been promoted to the third tier 676*c* and received the 5× award enhancement for a subsequent play of the game 670). The other players 674 (those not finishing first in the Power Bank) are returned to one of the "seats" in one of the banks 680*a* of the first tier 676*a*. In other words, the "losing" players from the Power Bank start over—they go to the first tier 676*a* and try to work their way back up to the Power Bank by winning their virtual bank 680*a* as described herein. Only the winner of the Power Bank (Dan) is permitted to remain in the Power Bank for a further subsequent play of the competitive wagering game 670. The other seats of the Power Bank 680*b* will be filled from the winners of the banks 680*a* of the first tier 676*a*, much as the first player (Victor) was promoted in FIG. 9.

Thus, the competitive wagering game 670, in an embodiment, may be an ongoing competition in which players enter at a first tier 676*a*, and are promoted to higher tiers 676*b,c* by satisfying certain promotion criteria (e.g. winning their virtual bank 680*a*). When such promotion criteria is satisfied, players 674 are promoted and moved to a higher tier 676*b,c* symbolized by a different bank (in this embodiment, the Power Bank). Each such promotion may be accompanied by an award enhancement (such as an increased individual award or multiplier usable on a subsequent play of the competitive wagering game 670.) The player (or players) in the top tier 676*c* may be permitted to remain in the top tier 676*c* for an unlimited number of plays of the competitive wagering game 670 so long as they continue to satisfy the winning or promotion criteria (winning the Power Bank, for example).

Figure 14:
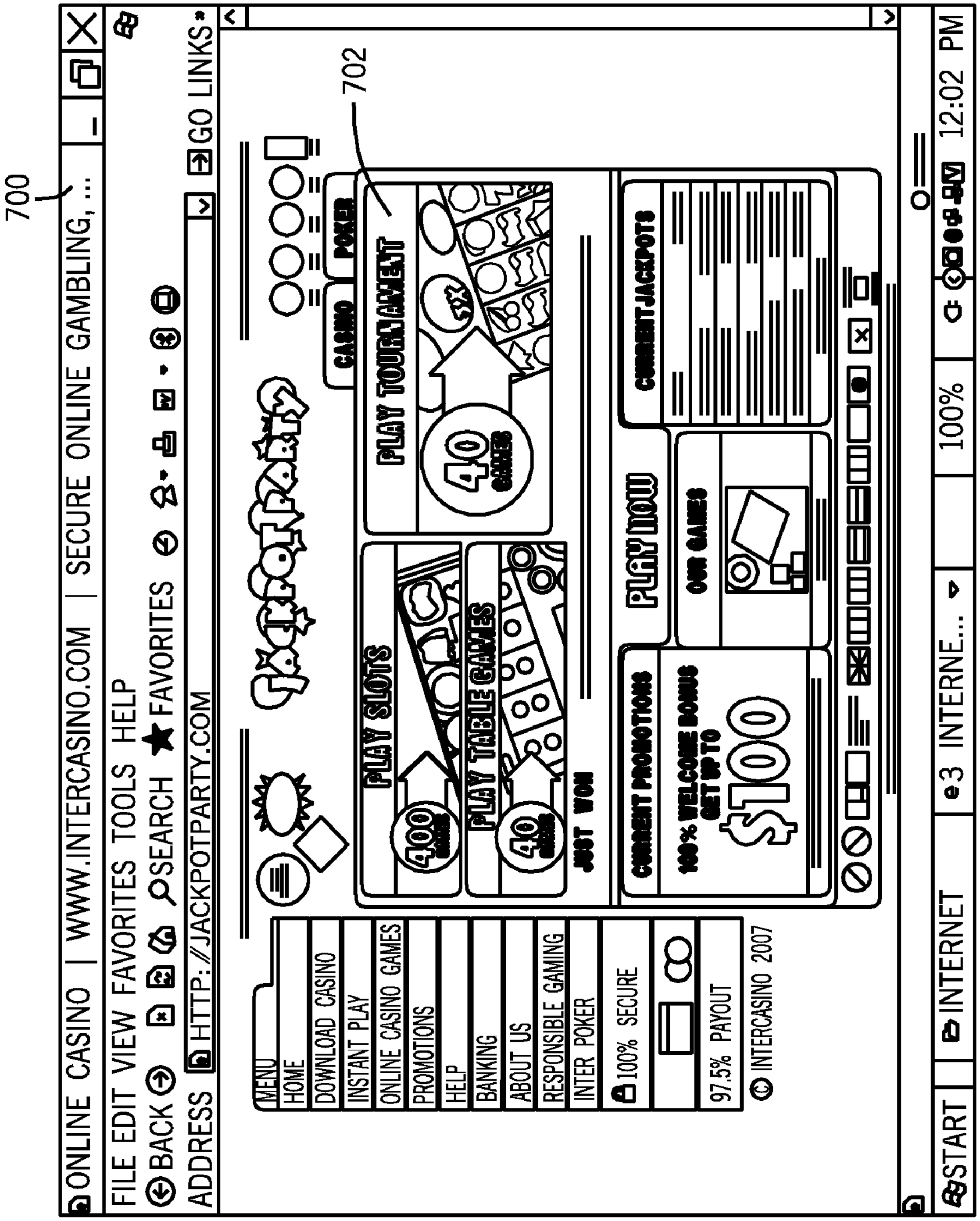
FIG. 14 is a depiction of an internet web-based interface for use with a gaming system executing a multi-tiered competitive wagering game.

Turning to FIG. 14, a web or internet interface 700 for executing or participating in the primary and competitive wagering games 660,670 is shown. A player using a computer, laptop, PDA, mobile phone, or other device having internet access may be allowed to access the gaming system 600 described to participate and play the games. For example, a player may use an internet browser (such as Internet Explorer or Netscape) to access a webpage operated by a casino, gaming manufacturer, or other operator. By accessing the proper webpage, the player may be given a menu of choices, including a "Play Tournament" option 702, or something similar thereto. By choosing the "Play Tournament Option" 702 the player may be directed to a webpage containing a display of one or more primary wagering games and allowing the player to access, register for, and become eligible for one or more competitive wagering games, as described herein. Thus, in this manner, the webpage serves to cause the player's computer or other internet capable device to act as a gaming terminal as described with reference to FIGS. 5 and 6. The player's computer or other internet-capable device can then interface with and become part of the gaming system 510 described in FIG. 5. This allows players remote from each other to participate in a community type competitive wagering game as described herein.

In alternative configurations, any number of differing tiers may be used in the competitive wagering game. For example, the number of tiers may be greater than the three tiers described in the FIGURES, or may be less than three. Moreover, the promotion criteria which a player must satisfy to advance to a higher tier for a subsequent play of the competitive wagering game may be any variety of criteria. In the embodiment described in the FIGURES, only the winning player is promoted to a higher tier. However, in other embodiments, more than one player may be advanced or promoted. For example, the top three players in each bank 680 may be promoted to the next higher level. Moreover, the promotion criteria may not be based solely on credits collected during the competitive wagering game. The criteria may evaluate and judge a player's performance based upon number of spins played, number of certain symbols collected, number of levels advanced, number of different winning combinations achieved, or any other measure of performance of the player in the competitive wagering game. In an embodiment, regardless of the nature of the performance criterion, it is posted in the leader boards 672*a,b* along with the player identifiers (player's name for example).

The form and nature of the primary wagering games and the competitive wagering game may vary greatly. In one alternative embodiment, the primary wagering game may be a poker game rather than a slot game. Moreover, in another alternative embodiment, the competitive wagering game is a poker game in which the participating players compete against one another for awards, prizes, credits, or "pots." For example, the players may compete in a tournament, such as a Texas Hold 'Em tournament, with certain players from a first or lower tier advancing to a second or higher tier based upon given promotion criteria. In one embodiment, for example, the player winning a tournament at his virtual "poker table" in the first tier is promoted to a second tier "poker table" and given an award enhancement for a subsequent play of the poker tournament. The award enhancement, for example, may be an increased amount of chips added to his chip stack. Alternatively, the award enhancement may be a multiplier or credit amount which enhances a credit award earned in the tournament. The poker tournament may be one where players compete directly against one another (player's hands are compared to one another), or alternatively may be one in which players' hands are compared against a paytable and awards are paid pursuant thereto. Moreover, the poker game may vary in form, and may or may not include community cards, drawing rounds, or other aspects of poker play. Other card games may be employed as well to form the basis for the primary and competitive wagering games.

In yet other alternative embodiments, the award enhancements may comprise awards or prizes other than multipliers. For example, the award enhancements provided may be credit amounts, free spins, free plays, cash, or even tangible prizes. Additionally, the award enhancements need not be the same for each tier. For example, promotion from the first tier to the second tier may be accompanied by a multiplier award enhancement while promotion from the second tier to a third tier may be accompanied by a credit amount award enhancement.

The players of the competitive wagering game may be organized in any appropriate manner to foster the competition occurring in the game (for example, the slot tournament shown in the FIGURES). The players may be placed in virtual banks, groups, teams, brackets, etc. Moreover, the players advancement through the tiers may be varied such that players may advance more than one tier at a time. Conditions may be placed on advancement as well, including for example, achieving a minimum score.

The competitive wagering game may be continuously ongoing such that players enter at a first tier, advance to higher tiers and are returned to the first tier if they fail to meet promotion criteria. In this way, such a competitive wagering game may be cyclical and endless, always available for players of the primary wagering games of the system. Alternatively, the competitive wagering game may have an ending, for example where an overall winning player (or players) is declared, and then the competition is reset for a subsequent occurrence of the game. For example, the players in the various tiers may be organized in a bracket form until one player finishes in first place for the competitive wagering game. Then the game may be reset where all eligible players are returned to the first tier and a new competition is commenced.

The system and methods of the present invention offer substantial benefits to players and operators alike. Players are incentivized to continue play of the wagering game to redeem award enhancements in future rounds of the competitive wagering game. This in turn increases wagers input into the system to the benefit of operators. Players receive an exciting and rewarding game play scenario in which they can monitor their progress vis-à-vis other players of the competitive wagering game. The possibility of being the winner of the Power Bank causes players to repetitively play the primary wagering game in an effort to be eligible for future occurrences of the competitive wagering game in which the application of the award enhancements can greatly increase awards and prizes. Other benefits are provided as well.

Each of these embodiments and obvious variations thereof is contemplated as falling within the spirit and scope of the claimed invention, which is set forth in the following claims.

What is claimed is:

1. A method of playing a competitive wagering game comprising:

receiving a wager from each of a first plurality of players;

displaying to each of the first plurality of players a first wagering game;

in response to a first triggering event, entering the first plurality of players into a competitive wagering game;

declaring a first player of the first plurality of players a winner of the competitive wagering game;

rendering the first player of the first plurality of players eligible to play a subsequent competitive wagering game responsive to the status of the first player as the winner of the competitive wagering game;

providing the first player with an award enhancement modifying an award awarded to the player during the subsequent competitive wagering game responsive to the status of the first player as the winner of the competitive wagering game;

in response to a second triggering event, entering the first player and a second plurality of players into the subsequent competitive wagering game.

2. The method of claim 1, wherein the award enhancement comprises a multiplier applied to an overall credit award achieved by the first player in the subsequent competitive wagering game.

3. The method of claim 1, further comprising determining whether the first player has won the subsequent competitive wagering game based on the award awarded to the first player, independent of the award enhancement.

4. The method of claim 3, wherein if the winner of the subsequent competitive wagering game is the first player, providing a second award enhancement for use in a second subsequent wagering game.

5. The method of claim 1, wherein the first plurality of players includes a first tier of players and a second tier of players.

6. The method of claim 5, wherein in response to the second triggering event, the first player is promoted from the first tier to the second tier.

7. The method of claim 5, further comprising providing the award enhancement to all players in the second tier.

8. The method of claim 1, wherein the first triggering event is a mystery trigger.

9. The method of claim 8, wherein the second triggering event is a mystery trigger.

10. The method of claim 1, further comprising evaluating at least one set of eligibility requirements to determine whether the first player is eligible for participation in the competitive wagering game.

11. A gaming system comprising:

a plurality of display terminals for displaying at least one primary wagering game;

at least one wager input device; and at least one controller operative to:

(i) cause the plurality of display terminals to display the at least one primary wagering game to a first plurality of players;

(ii) in response to a first triggering event, enter the first plurality of players into a first play of a competitive wagering game;

(iii) determine a first subset of the first plurality of players which satisfy a first set of promotion criteria;

(iv) provide each of the players in the first subset with an award enhancement for use in a subsequent play of the competitive wagering game;

(v) render each of the players in the first subset eligible to play the subsequent play of the competitive wagering game responsive to the satisfaction of the first set of promotion criteria by the first plurality of players;

(vi) enter each of the players in the first subset into a second play of the competitive wagering game; and (vii) enhance a total award achieved by each of the players in the first subset in the second play of the competitive wagering game with the award enhancement.

12. The gaming system of claim 11, wherein the award enhancement comprises a multiplier applied to an overall credit award achieved by each of the players in the first subset in the subsequent competitive wagering game.

13. The gaming system of claim 11, wherein the at least one controller is further operative to determine a second subset of the first subset of players which satisfy a second set of promotion criteria and enter each of the players in the second subset into a third play of the competitive wagering game.

14. The gaming system of claim 11, wherein the first plurality if players includes a first tier of players and a second tier of players.

15. The gaming system of claim 14, wherein the first subset of players are in the second tier.

16. The gaming system of claim 11, wherein the first triggering event is a mystery trigger.

17. The gaming system of claim 16, wherein the second triggering event is a mystery trigger.

18. The gaming system of claim 11, wherein the at least one controller is further operative to evaluate at least one set of eligibility requirements to determine whether each of the first plurality of players is eligible for participation in the community wagering game.

19. A method of playing a competitive wagering game comprising:

determining a set of players in accordance with at least a first set of eligibility criteria;

organizing the set of players into a plurality of tiers including at least a first tier and a second tier;

displaying a first occurrence of the competitive wagering game and determining a first individual award in the competitive wagering game for each of the players in the first tier;

evaluating each of the players in the first tier for promotion in accordance with a first set of promotion criteria;

for each player in the first tier meeting the first set of promotion criteria, promoting such player to the second tier for a second occurrence of the competitive wagering game;

displaying the second occurrence of the competitive wagering game and determining a second individual award in the competitive wagering game for each of the players in the second tier; and for each of the players in the second tier, enhancing such players second individual award by a first award enhancement.

20. The method of claim 19, wherein each of the first and second individual awards comprise a credit amount.

21. The method of claim 20, wherein the first award enhancement comprises a multiplier.

22. The method of claim 19, wherein the first set of eligibility criteria comprises having a positive time balance in a time eligibility meter during play of a primary wagering game when the first occurrence of the competitive wagering game is triggered.

23. The method of claim 19, wherein the first set of promotion criteria comprises achieving the highest first individual award.

24. The method of claim 19, further comprising:

evaluating each of the players in the second tier for promotion in accordance with a second set of promotion criteria;

for each players in the second tier meeting the second set of promotion criteria, promoting such player to a third tier for a third occurrence of the competitive wagering game;

displaying the third occurrence of the competitive wagering game and determining a third individual award in the competitive wagering game for each of the players in the third tier; and for each of the players in the third tier, enhancing such players third individual award by a second award enhancement.

25. The method of claim 24, wherein the second award enhancement is greater than the first award enhancement.

* * * * *